United States Patent
Do et al.

(10) Patent No.: US 6,798,738 B1
(45) Date of Patent: Sep. 28, 2004

(54) FFT WINDOW POSITION RECOVERY APPARATUS AND METHOD FOR OFDM SYSTEM RECEIVER

(75) Inventors: Sang-hyun Do, Seoul (KR); Hyung-jin Choi, Seoul (KR); Hong-bae Cho, Junlanam-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/509,676

(22) PCT Filed: Sep. 28, 1998

(86) PCT No.: PCT/KR98/00300

§ 371 (c)(1),
(2), (4) Date: Jul. 25, 2000

(87) PCT Pub. No.: WO99/17493

PCT Pub. Date: Apr. 8, 1999

(30) Foreign Application Priority Data

Sep. 30, 1997 (KR) ............................................. 97-50376

(51) Int. Cl.[7] ................................................ H04J 11/00
(52) U.S. Cl. ........................................ 370/210; 375/354
(58) Field of Search ................................ 370/203, 210, 370/310, 343, 344, 350; 375/354–376

(56) References Cited

U.S. PATENT DOCUMENTS 5,761,190 A * 6/1998 Yamauchi et al. .......... 370/210
5,812,523 A * 9/1998 Isaksson et al. ............ 370/208
6,226,337 B1 * 5/2001 Klank et al. ................ 375/367
2003/0142764 A1 * 7/2003 Keevill et al. .............. 375/341

FOREIGN PATENT DOCUMENTS

| EP | 0 730 357 A2 | 9/1998 |
| GB | 2 318 953 B1 | 5/1998 |
| JP | 6-244818 A | 9/1994 |
| JP | 9-200176 A | 7/1997 |
| WO | 97/07 620 A1 | 2/1997 |

* cited by examiner

*Primary Examiner*—Huy D. Vu
*Assistant Examiner*—Jason Mattis
(74) *Attorney, Agent, or Firm*—Sughrue Mion, PLLC

(57) ABSTRACT

A fast Fourier transform (FFT) window position recovery apparatus in an orthogonal frequency division multiplexing (OFDM) receiver is provided. This apparatus, in an OFDM system receiver which receives an OFDM symbol comprised of a useful data interval and a guard interval and recovers a FFT window position, includes: an analog-to-digital converter (ADC) for converting a received OFDM signal into a digital complex sample; a symbol start detector for detecting a power difference between the digital complex samples output by the ADC and detecting a position having a minimum absolute value of the power difference between the samples, as a symbol starting position; and a FFT window controller for activating FFT by moving the FFT window position using symbol start information detected by the symbol start detector. The influence of frequency and phase offsets is reduced by using the power difference between adjacent samples delayed by the useful data interval, thus improving the reliability of a system.

6 Claims, 3 Drawing Sheets

FFT WINDOW POSITION RECOVERY APPARATUS AND METHOD FOR OFDM SYSTEM RECEIVER

TECHNICAL FIELD

The present invention relates to an orthogonal frequency division multiplexing (OFDM) system, and particularly, to a fast Fourier transform (FFT) window position recovery apparatus and method in an OFDM receiver.

BACKGROUND ART

FIG. 1 is a block diagram showing the configuration of a general OFDM system receiver. First, a symbol of an OFDM signal, when N subcarriers are used in the OFDM system, comprises N useful data samples output by transmitting inverse fast Fourier transform (IFFT) and a guard interval having the lengths of G samples inserted before a useful data interval to prevent interference between the symbols. Here, the guard interval copies the end portion of the useful data interval. A transmitter (not shown) adds G complex values to N complex values output by an inverse fast Fourier transformer (IFFT), and sequentially transmits a symbol comprised of a total of (G+N) samples. Here, the guard interval is generally longer than a delay spread time of a channel. For example, a European digital TV broadcast standard defines guard intervals having lengths of ¼, 1/8, 1/16 and 1/32 of an actual symbol length, and a transmission side selects and uses one among the above-described guard intervals. Time synchronization must be accurately performed to allow a receiver to recover a received OFDM signal. Time synchronization is comprised of FFT window position recovery for accurate parallel processing of a signal, and sampling clock recovery for sampling a signal having a maximum signal-to-noise ratio (SNR). A j-th symbol comprised of a useful interval and a guard interval which are output by an IFFT (not shown) of a transmitter is expressed by the following Equation 1:

$$s_j = \sum_{n=-G}^{N-1} x_{j,n} = \sum_{n=-G}^{-1}\sum_{k=0}^{N-1} X_{j,k} e^{j2\pi(N+n)/N} + \sum_{n=0}^{N-1}\sum_{k=0}^{N-1} X_{j,k} e^{j2\pi kn/N} \quad (1)$$

wherein j denotes a symbol number, k is a carrier index, N is the number of effective data samples, and n indicates a sampling time. In the right side of Equation 1, the first term is a guard interval portion, and the second term is a useful data portion.

As shown in FIG. 1, an analog-to-digital converter (ADC) 110 samples a received OFDM signal. A symbol start detector 120 receives the sampled OFDM signal and detects a start portion of a symbol. A FFT window controller 130 designates a FFT window point in time to activate a useful data portion of a FFT 140 using the symbol start information detected by the symbol start detector 120. As shown in FIG. 2, the FFT window transmits only the useful data interval excluding the guard interval in a received signal to the FFT. Generally, the symbol start detector 120 of FIG. 1 detects a symbol start portion using either a correlation value between received signals or the quantized values of the input signals. However, the first way requires a maximum position of the correlation value between the received signals, resulting in complicated system realization. The second way provides a simple structure because of the 2-bit quantization. However, when a frequency offset defined as a carrier frequency synchronization error, i.e., a phase difference of $e^{j(\omega_0 t + \phi)}$, exists, phase rotation of the input signal occurs to thus change the phases of a guard interval and the end portion of a useful data interval. Thus, a position having a maximum correlation value cannot be found, and symbol starting position recovery is thus difficult.

DISCLOSURE OF THE INVENTION

It is an object of the present invention to provide a method for recovering a phase error of a FFT window using a power difference between received signals in a predetermined section in an orthogonal frequency division multiplexer (OFDM) receiver.

It is another object of the present invention to provide an apparatus for recovering a phase error of a FFT window using a power difference between received signals in a predetermined section in an OFDM receiver.

To accomplish the first object, there is provided a fast Fourier transform (FFT) window position recovery method in an orthogonal frequency division multiplexing (OFDM) system receiver which receives an OFDM symbol comprised of a useful data interval and a guard interval and recovers a FFT window position, the method comprising the steps of: (a) converting a received OFDM signal into a digital complex sample; (b) obtaining a power difference between the digital complex sample output by the step (a) and a complex sample value delayed by predetermined samples, and detecting a position having a maximum power value between the samples, as a symbol starting position; and (c) activating FFT while moving the FFT window position using symbol start information detected by the step (b).

To accomplish the second object, there is provided a fast Fourier transform (FFT) window position recovery apparatus in an orthogonal frequency division multiplexing (OFDM) system receiver which receives an OFDM symbol comprised of a useful data interval and a guard interval and recovers a FFT window position, the apparatus comprising: an analog-to-digital converter (ADC) for converting a received OFDM signal into a digital complex sample; a symbol start detector for detecting a power difference between the digital complex samples output by the ADC and detecting a position having a minimum absolute value of the power difference between the samples, as a symbol starting position; and a FFT window controller for activating FFT by moving the FFT window position using symbol start information detected by the symbol start detector.

BEST MODE FOR CARRYING OUT THE INVENTION

Figure 1:
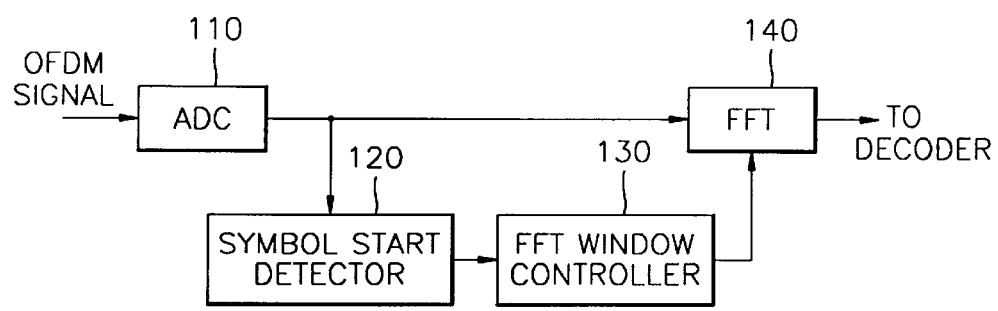
FIG. 1 is a block diagram showing the configuration of a general orthogonal frequency division multiplexing (OFDM) system receiver.
Figure 2:
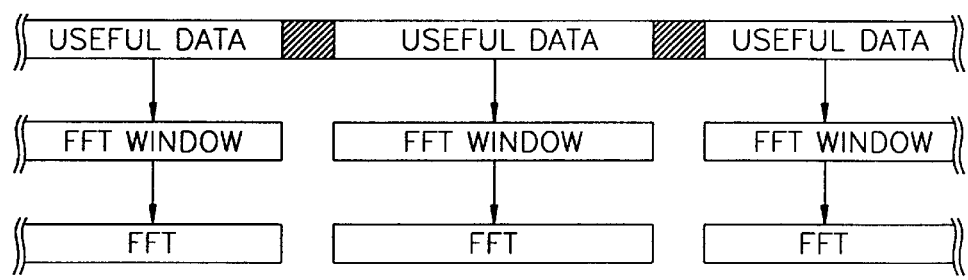
FIG. 2 is a concept view for explaining a fast Fourier transform (FFT) window in the FFT window controller of FIG. 1.
Figure 3:
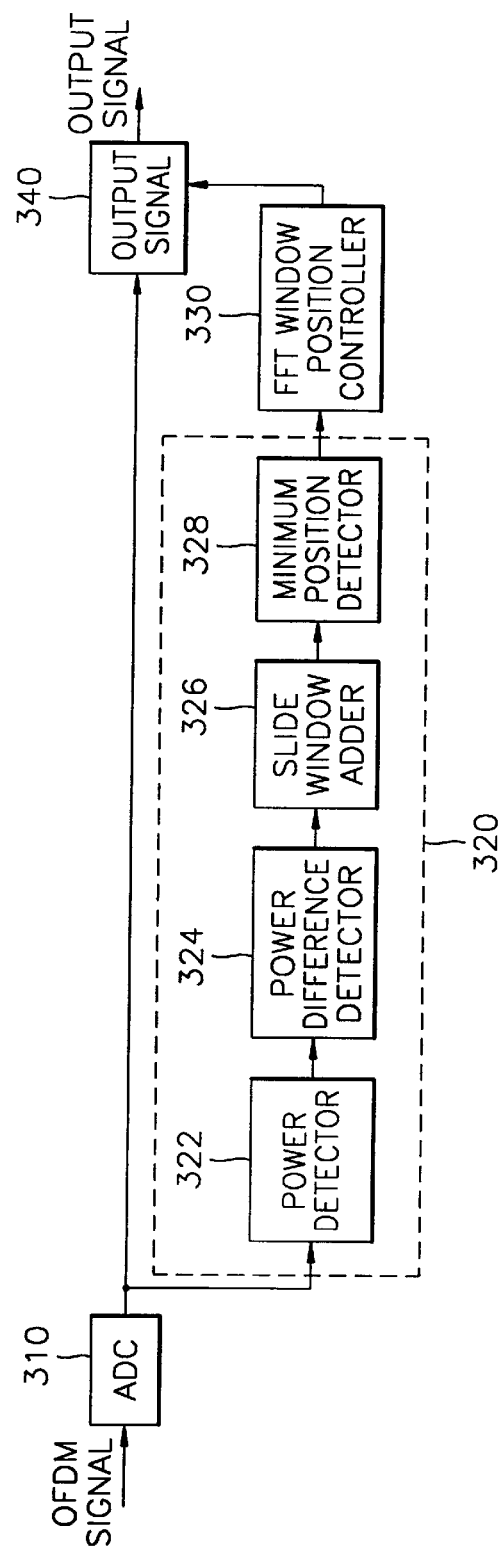
FIG. 3 is a block diagram of a FFT window position recovery apparatus in an OFDM system receiver according to the present invention.

Referring to FIG. 3, a FFT window position recovery apparatus in an OFDM receiver according to the present invention receives an OFDM signal, and is comprised of an analog-to-digital converter (ADC) 310, a starting position detector 320, a FFT window position controller 330, and a fast Fourier transformer (FFT) 340. Here, the starting position detector 320 includes a power detector 322, a power difference detector 324, a slide window adder 326, and minimum value position detector 328.

Figure 4:
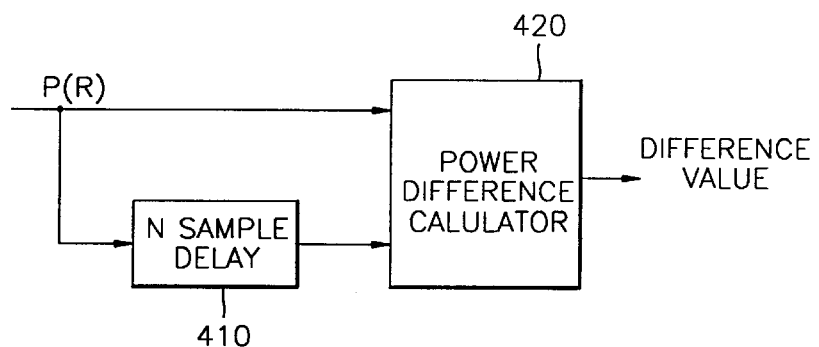
FIG. 4 is a block diagram of the power difference detector 324 of FIG. 3.

Referring to FIG. 4, the power difference detector 324 of FIG. 3 is comprised of an N sample delay 410 and a power difference calculator 420.

Figure 5:
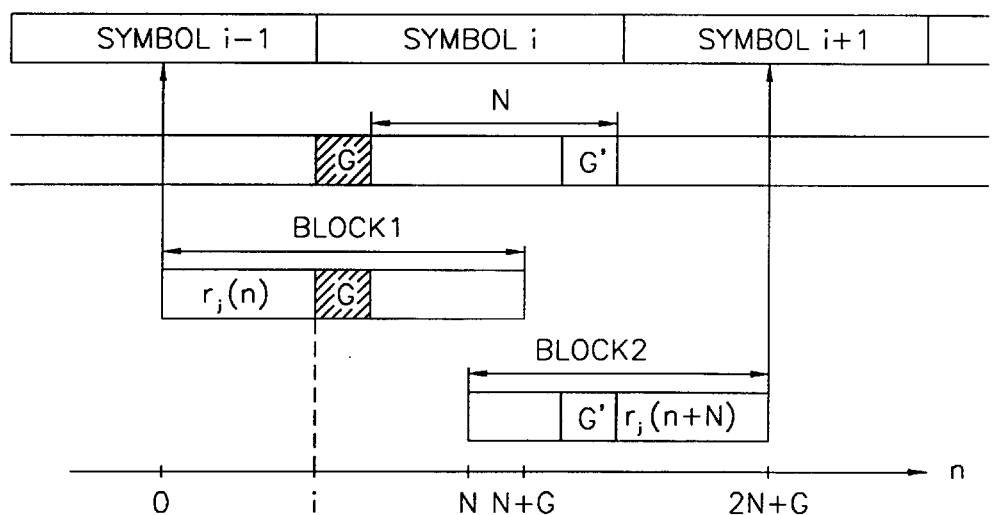
FIG. 5 is a concept view for FFT window position search.

FIG. 5 is a concept view for FFT window position recovery according to the present invention.

The operation and effects of the present invention will now be described referring to FIGS. 1 through 5.

First, an OFDM signal output by a transmission port (not shown) has not only noise but also a phase error or frequency error, and is a complex signal as expressed in Equation 2:

$$y(t)=s(t)\cdot e^{j(\omega_0 t+\phi)}+n(t) \qquad (2)$$

wherein s(t) is a transmission signal, $\omega_0$ is a frequency error, $\phi$ is a phase error, and n(t) is a noise.

The ADC 310 samples the input OFDM signal as expressed in Equation 2, and converts the OFDM signal into digital data as expressed in Equation 3:

$$y(k)=y(t),\ t=kT \qquad (3)$$

wherein y(k) is a complex sample, y(t) is a received OFDM signal, k is 0, 1, 2, . . . , and T is a rated sampling period.

The symbol start detector 320 obtains a power difference between an input complex sample y(k) and an input complex sample delayed by N samples, and detects a position having a minimum power value between the samples, as a symbol staring portion. That is, in order to remove the influence of a phase/frequency error (phase/frequency error between $r_t(n)$ and $r_t(n+N)$ shown in FIG. 5), the power detector 322, as shown in FIG. 3, detects a power value P(k) of the complex signal y(k) as expressed in following Equation 4:

$$P(k)=y(k)_I^2+y(k)_Q^2 \qquad (4)$$

wherein $y(k)_I$ is an in-phase component of y(k), and $y(k)_Q$ is a quadrature component of y(k).

The power difference detector 324 obtains a power difference between two samples spaced by N samples from each other.

That is, as shown in FIG. 4, the power difference calculator 420 calculates a difference between a power value P(k) output by the power detector 322 and a power value delayed by N samples by the N sample delay 410. Referring to the concept view of FIG. 5, a first block BLOCK1 is a sample value stored from an arbitrary position (0) to a symbol length (N+G), and a second block BLOCK2 is a sample value stored from the start point in time N to a symbol length (2N+G). If a guard interval (G) in the first block BLOCK1 is N samples delayed from the storing position by the N sample delay 410, then it is on the same level as the end portion of useful data interval (G') in the second block BLOCK2 having the same data as the guard interval (G). In the correlation between the first and second blocks BLOCK1 and BLOCK2, the sections G and G' are most closely correlated with each other because they have the same data. The residual sections hardly have correlation with each other because they have arbitrary data. Accordingly, the difference between a power value delayed by N samples and a power value of a received signal is "0" in a portion of the useful data interval having the same data as the guard interval (in the state of no noise). However, in the remaining portion, a positive or negative difference value (direction) between arbitrary sample values is generated. Here, when the positive or negative value is used without change, it is difficult to discriminate the guard interval from the other interval. Thus, the absolute value of the difference is obtained to take only the value of the received signal regardless of the sign thereof. The slide window adder 326 adds the power difference values output by the power difference detector 324 within the guard interval (G). The slide window adder 326 performs addition while moving a window from the start point in time 0 to a point of time N+G in units of one sample. As shown in FIG. 5, the output value of the slide window adder 326 is minimum at a symbol start point in time (i). The minimum value position detector 328 detects a sample position having a minimum value among the output values of the slide window adder 326, and detects the point of time with respect to the minimum value as the symbol starting point.

The operations of the power detector 322, the power difference detector 324, the slide window adder 326, and the minimum value position detector 328 can be expressed in the following Equation 5:

$$\underset{\theta}{\text{Mim}}\sum_{n=\theta}^{\theta+G-1}|p_i(n)-p_i(n+N)|,\ p_i(n)=|y_i(n)|^2\ \text{or}\ |y_i(n)| \qquad (5)$$

Thus, minimum value position information detected by the minimum value position detector 328 becomes an FFT window moving value of the FFT window position controller 330. The FFT window position controller 330 designates the position where fast Fourier transform (FFT) is activated by the FFT 340 using position information of the minimum value detected by the minimum value position detector 328. The FFT 340 fast-Fourier-transforms data generated by the ADC 310 according to a FFT window position control signal generated by the FFT window position controller 330.

Industrial Applicability

According to the present invention as described above, the influence of frequency and phase offsets is reduced by recovering a FFT window phase error using the power difference between received signals in a predetermined interval in an OFDM receiver, thus improving the reliability of a system.

What is claimed is:

1. A fast Fourier transform (FFT) window position recovery method in an orthogonal frequency division multiplexing (OFDM) system receiver which receives an OFDM symbol comprised of a useful data interval and a guard interval and recovers an FFT window position, the method comprising:

(a) converting a received OFDM signal into a digital complex sample;

(b) obtaining a power difference between said digital complex sample output of step (a) and a complex sample value delayed by predetermined samples, and detecting a position having a minimum absolute value of the power difference between the samples, as a symbol starting position; and (c) activating FFT while moving the FFT window position using the symbol starting position detected by step (b).

2. A fast Fourier transform (FFT) window position recovery apparatus in an orthogonal frequency division multiplexing (OFDM) system receiver which receives an OFDM symbol comprised of a useful data interval and a guard interval and recovers an FFT window position, the apparatus comprising:

an analog-to-digital converter (ADC) for converting a received OFDM signal into digital complex samples;

a symbol start detector for detecting a power difference between said digital complex samples output by the ADC and detecting a position having a minimum absolute value of the power difference between the samples, as a symbol starting position; and an FFT window controller for activating FFT by moving said FFT Window position using symbol start position detected by said symbol start detector.

3. The FFT window position recovery apparatus in an OFDM system receiver as claimed in claim 2, wherein said symbol start detector comprises:

a power detector for detecting a power value of said digital complex samples output by said ADC;

a power difference detector for detecting a difference between a power value output by said power detector and a power value delayed at an interval of predetermined samples;

a slide window adder for adding the power value difference detected by said power difference detector while moving the power difference values by every sample within said guard interval; and a minimum value position detector for detecting a minimum value among the output values of said slide window adder.

4. The FFT window position recovery apparatus in an OFDM system receiver as claimed in claim 3, wherein said power difference detector comprises:

a delay for delaying by said predetermined samples the power values of said digital complex samples output by said power detector;

a power difference calculator for calculating a difference between a power value of said digital complex samples output by said power detector and said power value delayed by said delay.

5. The FFT window position recovery apparatus in an OFDM system receiver as claimed in claim 4, wherein said delay is delayed by said useful data interval.

6. The FFT window position recovery apparatus in an OFDM system receiver as claimed in claim 3, wherein the minimum value detected by said minimum value position detector is a power value of a portion of the useful data interval which has the same data as the guard interval.

* * * * *